(12) United States Patent
Wachinger et al.

(10) Patent No.: US 11,953,472 B2
(45) Date of Patent: Apr. 9, 2024

(54) SYSTEM AND METHOD FOR COMPONENT INTERCONNECTION IN HPLC

(71) Applicant: DIONEX SOFTRON GMBH, Gemering (DE)

(72) Inventors: Thomas Wachinger, Altomuenster (DE); Christoph Hollnagel, Gauting (DE)

(73) Assignee: Dionex Softron GmbH, Germering (DE)

( * ) Notice: Subject to any disclaimer, the term of this patent is extended or adjusted under 35 U.S.C. 154(b) by 6 days.

(21) Appl. No.: 17/667,139

(22) Filed: Feb. 8, 2022

(65) Prior Publication Data

US 2022/0163491 A1    May 26, 2022

Related U.S. Application Data

(63) Continuation of application No. 15/809,270, filed on Nov. 10, 2017, now Pat. No. 11,280,768.

(30) Foreign Application Priority Data

Nov. 10, 2016    (DE) .................. 10 2016 121519.8

(51) Int. Cl.
| | |
|---|---|
| *G01N 30/20* | (2006.01) |
| *B01D 15/22* | (2006.01) |
| *G01N 30/02* | (2006.01) |
| *G01N 30/08* | (2006.01) |
| *G01N 30/24* | (2006.01) |
| *G01N 30/46* | (2006.01) |
| *G01N 30/60* | (2006.01) |

(52) U.S. Cl.
CPC ............. *G01N 30/20* (2013.01); *B01D 15/22* (2013.01); *G01N 30/60* (2013.01); *G01N 2030/027* (2013.01); *G01N 2030/085* (2013.01); *G01N 2030/207* (2013.01); *G01N 30/24* (2013.01); *G01N 30/468* (2013.01)

(58) Field of Classification Search
CPC ........ G01N 30/20; G01N 30/60; G01N 30/24; G01N 30/468; G01N 2030/027; G01N 2030/085; G01N 2030/207; G01N 2030/021; G01N 2030/022; B01D 15/22
USPC ....................................................... 73/61.56
See application file for complete search history.

(56) References Cited

U.S. PATENT DOCUMENTS

| | | | |
|---|---|---|---|
| 7,195,229 B2 * | 3/2007 | Maeda | ........... G01N 30/24 |
| | | | 251/281 |
| 8,677,808 B2 | 3/2014 | Ozbal et al. | |
| 8,806,922 B2 | 8/2014 | Hochgraeber | |
| | | (Continued) | |

FOREIGN PATENT DOCUMENTS

| | | | | |
|---|---|---|---|---|
| EP | 1455185 A1 * | 9/2004 | .......... | G01N 30/463 |
| JP | H0587787 A * | 4/1993 | | |
| | (Continued) | | | |

*Primary Examiner* — Mischita L Henson
*Assistant Examiner* — Monica S Young

(57) ABSTRACT

A system for component interconnection for use in liquid chromatography includes a first switching valve and a second switching valve. A first connecting line fluidly connects the first switching valve to the second switching valve. A second connecting line fluidly connects the first switching valve to the second switching valve. A metering device is located in the first connecting line.

18 Claims, 6 Drawing Sheets

(56) References Cited

U.S. PATENT DOCUMENTS

| | | | | |
|---|---|---|---|---|
| 2003/0143123 A1* | 7/2003 | Maeda | G01N 35/1097 | 422/510 |
| 2005/0167348 A1* | 8/2005 | Iwata | G01N 30/468 | 210/198.2 |
| 2005/0218055 A1* | 10/2005 | Hayashi | G01N 30/463 | 210/198.2 |
| 2006/0045810 A1* | 3/2006 | Choikhet | G01N 35/1097 | 422/400 |
| 2006/0219638 A1* | 10/2006 | Watanabe | G01N 30/463 | 422/63 |
| 2007/0251302 A1* | 11/2007 | Iwata | G01N 30/32 | 73/61.56 |
| 2008/0044309 A1 | 2/2008 | Yamashita et al. | | |
| 2008/0098828 A1* | 5/2008 | Li | G01N 35/1097 | 73/863.73 |
| 2008/0245715 A1* | 10/2008 | Iwata | G01N 30/468 | 210/198.2 |
| 2009/0166525 A1* | 7/2009 | Hughes | G01N 30/32 | 250/282 |
| 2011/0209532 A1* | 9/2011 | Maeda | G01N 30/24 | 73/61.56 |
| 2012/0024048 A1* | 2/2012 | Maeda | G01N 30/20 | 73/61.55 |
| 2012/0132013 A1* | 5/2012 | Glatz | G01N 30/36 | 73/863.02 |
| 2012/0255617 A1* | 10/2012 | Miyazoe | F16K 11/07 | 137/1 |
| 2014/0306105 A1* | 10/2014 | Netto | H01J 49/26 | 250/288 |
| 2017/0106364 A1* | 4/2017 | Tomita | G01N 35/1095 | |
| 2017/0209812 A1* | 7/2017 | Dlugasch | G01N 30/16 | |
| 2018/0088091 A1* | 3/2018 | Cormier | G01N 30/22 | |
| 2018/0128787 A1* | 5/2018 | Hollnagel | G01N 30/14 | |
| 2018/0128788 A1* | 5/2018 | Wachinger | G01N 30/60 | |
| 2018/0128789 A1* | 5/2018 | Hollnagel | G01N 30/20 | |
| 2018/0128792 A1* | 5/2018 | Wachinger | G01N 30/24 | |
| 2019/0120800 A1 | 4/2019 | Cormier | | |

FOREIGN PATENT DOCUMENTS

| | | | | |
|---|---|---|---|---|
| JP | H0587789 A | * | 4/1993 | |
| JP | 2006234804 A | * | 9/2006 | G01N 33/558 |
| KR | 20100019440 A | * | 2/2010 | |
| WO | WO-2005024412 A1 | * | 3/2005 | G01N 30/463 |
| WO | WO-2008150763 A1 | * | 12/2008 | G01N 30/463 |
| WO | WO-2010118414 A1 | * | 10/2010 | B01D 15/24 |
| WO | WO-2015082392 A1 | * | 6/2015 | C12M 23/16 |

* cited by examiner

SYSTEM AND METHOD FOR COMPONENT INTERCONNECTION IN HPLC

CROSS-REFERENCE TO RELATED APPLICATION

This application is a continuation of U.S. patent application Ser. No. 15/809,270, filed on Nov. 10, 2017. U.S. patent application Ser. No. 15/809,270 claims the priority benefit under 35 U.S.C. § 119 to German Patent Application No. DE 10 2016 121 519.8, filed on Nov. 10, 2016, the disclosure of which is incorporated herein by reference.

FIELD OF THE INVENTION

The invention relates to component interconnection, particularly in High Performance Liquid Chromatography (HPLC). More precisely, the invention relates to a valve switching mechanism for HPLC systems.

BACKGROUND

In High Performance Liquid Chromatography (HPLC), a sample to be analysed is passed through a chromatography column to be separated into its constituent parts. The sample separation is generally performed in the chromatography, or analytical column (also called separation column) at high pressure. Such pressure can be on the order of a few hundred bar, or about a 1000 bar, or even more, such as 1500 bar. The sample can be pushed through the separation column by a pump. During the sample movement through the column, its individual constituents interact differently with the material packed in the column (usually granular material). In this way, different sample constituents move through the separation column at different speeds and can be separately measured. Before reaching the separation column, the sample must generally be introduced into a liquid chromatography system from a sample reservoir.

Before a sample is loaded into the separation column, it can pass through several other components of a liquid chromatography system. Those can comprise a sampler, a sample loop, a trap column and various tubing or capillaries, although not all components need to be present in every liquid chromatography system. To ensure that the system remains pressurized and to guarantee a leak proof system minimizing dead volumes, sophisticated connection mechanisms are needed in such systems.

U.S. Pat. No. 8,677,808 B2 discloses, in one embodiment, a sample injection system including a vacuum source, a conduit in communication with the vacuum source, a fluid sensor configured to detect the presence of the fluid in the conduit, a sample loop in communication with the conduit; and a sipper in communication with the sample loop.

U.S. Pat. No. 8,806,922 B2 discloses a sample injector for liquid chromatography including an injection valve having a waste port, two sample loop ports, and two high-pressure ports. One high-pressure port can be connected to a pump and the other high-pressure port can be connected to a chromatography column. A sample loop is connected to one of the sample loop ports on one end and to a pump volume of a sample conveying device on the other end. A section of the sample loop can be separated to facilitate receiving a sample fluid in the sample loop. A control unit controls the injection valve and the sample conveying device. The sample injector allows a sample to be loaded into the sample loop and then pressurized to an operating pressure prior to injecting the sample into the chromatography column. The sample loop may also be isolated from the operating pressure for facilitating depressurization of the loop.

Liquid chromatography systems often use switching valves to fluidly connect various system components with each other. In other words, switching valves are responsible for connection and separation of fluid paths or ports where HPLC components are connected. Such valves can be advantageous, as they can be manufactured to withstand sufficient pressures and to be leak-proof. Generally, valves in liquid chromatography are also adapted to minimize dead volumes, or spaces where liquid can gather and remain. Such valves can for example comprise "ports" and "grooves". A component of the system can be fluidly connected to a particular port. Grooves can be used to connect two ports with each other. A valve in a liquid chromatography system can also comprise several switching positions, that is, several configurations which allow for interconnecting of different system components. For example, this can be achieved by having system elements fixedly connected to individual ports and using grooves to fluidly connect said ports to each other in different configurations. Some liquid chromatography systems may comprise a plurality of valves for component interconnection, such as two valves. This allows for a larger margin of manoeuvre and flexibility in interconnecting system components.

In some prior art, only one switching valve is used to interconnect the components in the various process steps.

SUMMARY

Different configurations or switching positions of switching valves allow for different steps of sample loading and system operation in a liquid chromatography system. For example, in a "load" switching position it should be possible to draw up a sample in the sample loop. This can be done via a pump or a metering device. If a trap column for sample filtering and concentration is present, a certain valve configuration should allow for sample trapping within it (i.e., transporting sample into the trap column). Another valve position could allow pre-compressing of the trap column (and subsequent decompressing) before bringing the sample into the analytical flow via an "inject" valve position. Some other switching positions could allow for pump purging and/or system washing.

Some problems arising with the valves described in the prior art are listed below. Not every problem occurs for every execution.

During sample analysis, the fluidic components including the trap column cannot be cleaned and the trap column cannot be loaded. That is, sample analysis on the one hand and cleaning and/or loading cannot be performed simultaneously.

The need to achieve two dead ends for pressure build-up during the pre-compressing of the sample, often leads to a valve design comprising prolonged grooves with an intermediate valve position. This can lead to sample dispersion, gradient distortion and carry-over.

The washing of the fluidics is often done with an additional washing or cleaning pump, requiring another separate component of the system and a valve port to connect it to.

The trapping of the sample is often done with an additional loading pump, requiring another separate component of the system and a valve port to connect it to.

Changing a solvent or a cleaning fluid can require hardware changes in some prior art, or manually replacing the solvent or cleaning fluid reservoir. That is, in some prior art it was not possible to freely choose a solvent or a cleaning fluid during the trapping or the washing phases.

In light of the above, it is an object of the present invention to provide a valve switching system and method for High Performance Liquid Chromatography allowing for multiple advantageous improvements. In particular, said system may allow for washing and reloading of the fluidic components and the trap column during sample analysis, avoiding non-thoroughly cleaned grooves and areas in which dead volume can assemble, avoiding the use of a further pump aside from the analytical pump and the metering device, and choosing freely a solvent and/or a washing solution. That is, it is an object of the present invention to overcome or at least alleviate the shortcomings and disadvantages of the prior art. In particular, it is an object of the present invention to provide a system for component interconnection for use in liquid chromatography and a corresponding method having improved characteristics as regards versatility, reduction of complexity, fail safety and simplicity of use and service.

Inter alia, the invention relates to two interconnected switching valves with an integrated metering device for liquid chromatography, particularly for high pressure liquid chromatography (HPLC). In other words, the invention relates to two switching valves connected by at least two connecting lines, with a metering device integrated on at least one connecting line. The connecting lines can also be separable, for example through a needle connecting with a needle seat.

The present invention is specified in the claims as well as in the below description. Preferred embodiments are particularly specified in the dependent claims and the description of various embodiments.

According to a first aspect, the present invention relates to a system for component interconnection for use in Liquid Chromatography. The system comprises a first switching valve; and a second switching valve; and a first connecting line fluidly connecting the first switching valve to the second switching valve and a second connecting line fluidly connecting the first switching valve to the second switching valve; and a metering device located in the first connecting line.

This system design with two switching valves, two connecting lines and a metering device disposed in one connecting line may allow the system to assume a configuration simultaneously allowing a sample to be analyzed and the trap column to be reloaded. Furthermore, it may also allow simultaneous sample analysis and washing of components including, for example, the trap column. Further still, by means of the discussed design, the overall number of pumps may be reduced. In particular, it may be possible for such a system to only use the metering device and one additional pump. That is, such a system may use two pumps only. This may be different to some prior art systems making use of a greater number of pumps. Having a reduced number of pumps may render the system of the present invention less complex than prior art systems. This may increase the efficiency of the system, make the system more fail safe (as there are fewer components that may malfunction) and simpler to service (as there are fewer components subject to wear).

Each switching valve may comprise at least four ports and at least two connecting elements, preferably at least five ports and at least three connecting elements.

The system may further comprise an analytical pump adapted to generate an analytical flow in the system.

The system may further comprise a separation column.

The system may further comprise a trap column.

The system may further comprise a sample pick up means adapted to retrieve a sample and a seat adapted to receive the sample pick up means.

The system may be adapted to connect the metering device to a sample reservoir via the sample pick up means in a sample draw position.

That is, the metering device may be adapted to draw in sample in this position.

The second switching valve may be adapted to connect the metering device with a dead end via the first connecting line in a sample draw position.

The metering device may be adapted to generate negative pressure drawing in a sample in the sample draw position.

The second switching valve may be adapted to connect the metering device and the first switching valve to dead-ends via the first connecting line and the second connecting line respectively in a pre-compressing position.

The metering device may be adapted to generate positive pressure pre-compressing components connected via the first switching valve including the sample in the pre-compressing position.

That is, the metering device may be used to pre-compress the system. This may be different to some prior art systems, where another device (typically a pump) was used to pre-pressurize the system. Thus, less components may be employed by the present system, thereby reducing the complexity of the present system.

The metering device may be adapted to pre-compress the sample to a pressure of a least 100 bar, such as at least 1000 bar, more preferably about 1500 bar.

The first switching valve may be adapted to simultaneously connect the analytical pump with the trap column and the trap column with the separation column in a sample inject position.

The second switching valve may be adapted to connect the metering device to at least one solvent reservoir, preferably to two distinct solvent reservoirs via the first connecting line in a washing position. Thus, different solvents may be used in the present system without having to manually connect another solvent reservoir to the system.

The metering device may be adapted to wash components connected via the first switching valve and the second switching valve in the washing position during sample analysis.

That is, component washing may be performed simultaneously to the sample analysis, thereby reducing the time required for sample analysis and washing, which may improve the efficiency of the system.

The system may be adapted to be reloaded with a new sample via the metering device in a reload position during sample analysis in the trap column.

Again, the present system allows these steps to be performed simultaneously, thereby saving time and enhancing the efficiency.

The system may further comprise a waste reservoir.

The system may further be adapted to fluidly connect the analytical pump with the waste reservoir via the second connecting line in a pump purge position.

The system may be adapted for high performance liquid chromatography.

The first switching valve may be adapted to assume at least two distinct switching positions.

The second switching valve may be adapted to assume at least three distinct switching positions.

One port of the first switching valve may be directly fluidly connected to the seat and to the first connecting line;

and two ports of the first switching valve may be directly fluidly connected to the trap column; and one port of the first switching valve may be directly fluidly connected to the separation column; and one port of the first switching valve may be directly fluidly connected to the analytical pump; and one port of the first switching valve may be directly fluidly connected to the second connecting line.

The term "direct fluid connection" or "directly fluidly connected" is used herein. When a port of a valve is said to be directly fluidly connected to another component, this should denote that fluid may flow from the port to the other component (and/or vice versa) without having to pass another port.

One port of the second switching valve may be directly fluidly connected to the waste reservoir; and one port of the second switching valve may be directly fluidly connected to the first solvent reservoir; and one port of the second switching valve may be directly fluidly connected to the first connecting line; and one port of the second switching valve may be directly fluidly connected to the second connecting line.

The system may further comprise a second solvent reservoir and one port of the second switching valve may be directly fluidly connected to the second solvent reservoir.

The first connecting line may comprise one end fluidly connected to the second switching valve; and tubing connecting the second switching valve to the metering device; and tubing connecting the metering device to the sample pick up means.

The first connecting line may be adapted to be separable via the sample pick up means and the seat.

Note, that connecting lines can also be separable. That is, a connecting line need not always connect the first valve to the second, but can interrupt this connection for some other function. For example, in certain preferred embodiments, the first connecting line is separable. This can be realized via the sample pick up means and the seat that can be located on the first connecting line. In the stand by position, the sample pick up means rests in the seat, ensuring that the first connecting lines is whole and is connecting the first and second switching valves. When, however, the sample pick up means moves to the sample reservoir in order to retrieve the sample, the first connecting line is separated between the sample pick up means and the seat. When the sample pick up means returns to the seat with the sample, the first connecting line is whole again.

The first switching valve may have an identical design as the second switching valve. This may lead to a particularly simple and efficient production process.

At least one of the first and the second switching valve may comprise at least one blind plug.

The present invention also relates to a use of the liquid chromatography system discussed above. Such a use may yield corresponding benefits as the system discussed above.

The second switching valve may switch the first connecting line to the solvent reservoir and the second connecting line to a dead end, and the metering device may generate negative pressure drawing in the solvent.

That is, the metering device may be used to draw in solvent.

The second switching valve may switch the first connecting line to a dead end, and the metering device may generate negative pressure for sample retrieval.

That is, the metering device is used to draw in sample into the system.

The second switching valve may switch the first connecting line and the second connecting line to dead ends, and the metering device may generate positive pressure for pre-compressing the trap column with the sample.

Thus, the metering device may also be used to pre-pressurize the system, which may omit the necessity of another pump for this purpose, thereby reducing the complexity of the system vis-à-vis prior art systems.

The second switching valve may switch the first connecting line and the second connecting line to dead ends, and the metering device may generate negative pressure for decompressing the trap column.

That is, the metering device may also be used for this purpose and thus, the complexity of the system may be further reduced.

The first switching valve may connect the first connecting line and the second connecting line with two sides of the trap column, and the second switching valve may connect the first connecting line with a dead end and the second connecting line with the waste reservoir, and the metering device may wash the trap column and the connecting lines.

Thus, the metering device may also be used to wash the components, thereby further reducing the need for further components and also reducing the complexity of the system.

The first switching valve may connect the analytical pump with the second connecting line and the second switching valve may connect the second connecting line with the waste reservoir, and the analytical pump may provide a flow to clean itself.

The use is may be use in liquid chromatography.

The use may be in high performance liquid chromatography.

The present invention also relates to a method for sample loading. The method comprises the steps of
  a. providing a liquid chromatography system comprising a first switching valve, a second switching valve, a first connecting line fluidly connecting the first switching valve to the second switching valve and a second connecting line fluidly connecting the first switching valve to the second switching valve, a metering device located in the first connecting line, a separation column, a trap column, and an analytical pump; and
  b. loading a sample into the trap column; and
  c. fluidly connecting the trap column to the separation column and the analytical pump to the trap column via the first switching valve and generating a flow from the analytical pump to the separation column.

That is, the system, which may comprise any of the features recited above, may be employed in a method for sample loading to also arrive at benefits corresponding to the ones discussed above.

The method may further comprise
  d. fluidly connecting the analytical pump to the separation column, wherein the trap column is not fluidly connected to the analytical pump or the separation column, and maintaining the flow from the analytical pump to the separation column.

That is, in this configuration, fluid may flow "directly" from the analytical pump to the separation column without passing the trap column.

The method may further comprise
  e. washing the trap column and the connecting lines; and/or
  f. loading another sample into the trap column.

The liquid chromatography system may further comprise a sample pick up means adapted to retrieve the sample and a seat adapted to receive the sample pick up means.

Step b. may comprise the sample pick up means being moved to a sample reservoir, the sample being sucked into the sample pick up means and into a tubing section adjacent to the sample pick up means, the sample pick up means being moved to the seat, the first switching valve being set to provide a fluid connection between the seat and the trap column, the sample being introduced into the trap column.

The sample may be sucked into the sample pick up means by means of the metering device generating negative pressure.

The sample may be introduced into the trap column by connecting the first connecting line to a dead end via the second switching valve and to the trap column via the first switching valve, and the metering device pushing the sample from the first connecting line to the trap column by generating positive pressure.

The liquid chromatography system may further comprise a waste reservoir.

Step e. may comprise fluidly connecting the first connecting line to a dead end via the second switching valve and to the trap column via the first switching valve, and the second connecting line to the trap column via the first switching valve and to the waste reservoir via the second switching valve, and generating a flow from the metering device to the waste reservoir.

Step d. may be performed concurrently with steps e. and/or f. Thus, the efficiency of the present method may be increased vis-à-vis such methods where such steps are performed one after the other.

The method may comprise pressurizing the trap column after loading the sample into it.

The trap column may be pressurized when the trap column is not fluidly connected to the analytical pump. That is, the trap column may be pressurized in a controller manner, thereby reducing pressure spikes (at the trap column) and pressure spikes and drops in the separation column. This may reduce the wear of these components (to thereby increase their service life). Furthermore, the controlled compression may reduce sample being dispersed, finally resulting in more defined peaks in subsequent analysis.

The trap column may be pressurized when the trap column is not fluidly connected to the separation column.

The metering device may pressurize the trap column. Thus, no further component may be needed for this purpose, reducing the complexity of the system.

The method may comprise depressurizing the trap column after supplying the sample from the trap column to the separation column.

The trap column may be depressurized when the trap column is not fluidly connected to the analytical pump.

The trap column may be depressurized when the trap column is not fluidly connected to the separation column.

The metering device may depressurize the trap column. All of the measures recited in the three preceding paragraphs may lead to a controlled decompression. This may be beneficial, as it may reduce the wear of the components vis-à-vis an uncontrolled and typically more rapid depressurization. Furthermore, it may also reduce the likelihood of fluids exiting the system rapidly (and potentially causing harm to users) and the likelihood of constituents outgassing.

The trap column may be pressurized to a pressure of at least 100 bar, preferably 1000 bar, more preferably at least 1500 bar.

The metering device may load the sample into the trap column.

The metering device may wash the trap column and the connecting lines by generating positive pressure. Again, by having such additional functionalities performed by the metering device, the complexity of the system may be reduced.

The present invention is also defined by the following numbered embodiments.

S1. A system for component interconnection for use in Liquid Chromatography comprising a first switching valve; and a second switching valve; and a first connecting line fluidly connecting the first switching valve to the second switching valve and a second connecting line fluidly connecting the first switching valve to the second switching valve; and a metering device located in the first connecting line.

S2. A system according to embodiment S1 wherein each switching valve comprises at least four ports and at least two connecting elements, preferably at least five ports and at least three connecting elements.

S3. A system according to any of the preceding embodiments further comprising an analytical pump adapted to generate an analytical flow in the system.

S4. A system according to any of the preceding embodiments further comprising a separation column.

S5. A system according to any of the preceding embodiments further comprising a trap column.

S6. A system according to any of the preceding embodiments further comprising a sample pick up means adapted to retrieve a sample and a seat adapted to receive the sample pick up means.

S7. A system according to the preceding embodiment wherein the system is adapted to connect the metering device to a sample reservoir via the sample pick up means in a sample draw position.

S8. A system according to any of the preceding embodiments wherein the second switching valve is adapted to connect the metering device with a dead end via the first connecting line in a sample draw position.

S9. A system according to the preceding embodiment wherein the metering device is adapted to generate negative pressure drawing in a sample in the sample draw position.

S10. A system according to any of the preceding embodiments wherein the second switching valve is adapted to connect the metering device and the first switching valve to dead-ends via the first connecting line and the second connecting line respectively in a pre-compressing position.

S11. A system according to the preceding embodiment wherein the metering device is adapted to generate positive pressure pre-compressing components connected via the first switching valve including the sample in the pre-compressing position.

S12. A system according to the preceding embodiments wherein the metering device is adapted to pre-compress the sample to a pressure of a least 100 bar, such as at least 1000 bar, more preferably about 1500 bar.

S13. A system according to the preceding embodiment and with features of embodiments S3, S4 and S5 wherein the first switching valve is adapted to simultaneously connect the analytical pump with the trap column and the trap column with the separation column in a sample inject position.

S14. A system according to any of the preceding embodiments wherein the second switching valve is adapted to connect the metering device to at least one solvent reservoir, preferably to two distinct solvent reservoirs via the first connecting line in a washing position.

S15. A system according to the preceding embodiment wherein the metering device is adapted to wash components connected via the first switching valve and the second switching valve in the washing position during sample analysis.

S16. A system according to any of the preceding embodiments and with the features of embodiment S4 wherein system is adapted to be reloaded with a new sample via the metering device in a reload position during sample analysis in the trap column.

S17. A system according to any of the preceding embodiments further comprising a waste reservoir.

S18. A system according to the preceding embodiment and with the features of embodiment S3 further adapted to fluidly connect the analytical pump with the waste reservoir via the second connecting line in a pump purge position.

S19. A system according to any of the preceding embodiments, wherein the system is adapted for high performance liquid chromatography.

S20. A system according to any of the preceding embodiments, wherein the first switching valve is adapted to assume at least two distinct switching positions.

S21. A system according to any of the preceding embodiments, wherein the second switching valve is adapted to assume at least three distinct switching positions.

S22. A system according to any of the preceding embodiments and with the features of embodiments S3, S4, S5 and S6 wherein one port of the first switching valve is directly fluidly connected to the seat and to the first connecting line; and two ports of the first switching valve are directly fluidly connected to the trap column; and one port of the first switching valve is directly fluidly connected to the separation column; and one port of the first switching valve is directly fluidly connected to the analytical pump; and one port of the first switching valve is directly fluidly connected to the second connecting line.

The term "direct fluid connection" or "directly fluidly connected" is used herein. When a port of a valve is said to be directly fluidly connected to another component, this should denote that fluid may flow from the port to the other component (and/or vice versa) without having to pass another port.

S23. A system according to any of the preceding embodiments and with the features of embodiments S14 and S17 wherein one port of the second switching valve is directly fluidly connected to the waste reservoir; and one port of the second switching valve is directly fluidly connected to the first solvent reservoir; and one port of the second switching valve is directly fluidly connected to the first connecting line; and one port of the second switching valve is directly fluidly connected to the second connecting line.

S24. A system according to the preceding embodiments further comprising a second solvent reservoir and wherein one port of the second switching valve is directly fluidly connected to the second solvent reservoir.

S25. A system according to any of the preceding embodiments and with the features of embodiment S6 wherein the first connecting line comprises one end fluidly connected to the second switching valve; and tubing connecting the second switching valve to the metering device; and tubing connecting the metering device to the sample pick up means.

S26. A system according to the preceding embodiment wherein the first connecting line is adapted to be separable via the sample pick up means and the seat.

S27. A system according to any of the preceding embodiments, wherein the first switching valve has an identical design as the second switching valve.

S28. A system according to any of the preceding embodiments, wherein at least one of the first and the second switching valve comprises at least one blind plug.

Note, that connecting lines can also be separable. That is, a connecting line need not always connect the first valve to the second, but can interrupt this connection for some other function. For example, in certain preferred embodiments, the first connecting line is separable. This can be realized via the sample pick up means and the seat that can be located on the first connecting line. In the stand by position, the sample pick up means rests in the seat, ensuring that the first connecting lines is whole and is connecting the first and second switching valves. When, however, the sample pick up means moves to the sample reservoir in order to retrieve the sample, the first connecting line is separated between the sample pick up means and the seat. When the sample pick up means returns to the seat with the sample, the first connecting line is whole again.

Below, use embodiments will be discussed. These embodiments are abbreviated by the letter "U" followed by a number. When reference is herein made to a use embodiment, those embodiments are meant.

U1. Use of the liquid chromatography system according to any of the preceding system embodiments.

U2. Use according to any of the preceding use embodiments and with features of embodiment S14 wherein the second switching valve switches the first connecting line to the solvent reservoir and the second connecting line to a dead end, and the metering device generates negative pressure drawing in the solvent.

U3. Use according to any of the preceding use embodiments, wherein the second switching valve switches the first connecting line to a dead end, and the metering device generates negative pressure for sample retrieval.

U4. Use according to any of the preceding use embodiments with the features of embodiment S5 wherein the second switching valve switches the first connecting line and the second connecting line to dead ends, and the metering device generates positive pressure for pre-compressing the trap column with the sample.

U5. Use according to any of the preceding use embodiments with the features of embodiment S5 wherein the second switching valve switches the first connecting line and the second connecting line to dead ends, and the metering device generates negative pressure for decompressing the trap column.

U6. Use according to any of the preceding use embodiments with the features of embodiments S5, S6 and S17 wherein the first switching valve connects the first connecting line and the second connecting line with two sides of the trap column, and the second switching valve connects the first connecting line with a dead end and the second connecting line with the waste reservoir, and the metering device washes the trap column and the connecting lines.

U7. Use according to any of the preceding use embodiments and with the features of embodiments S3 and S17 wherein the first switching valve connects the analytical pump with the second connecting line and the second switching valve connects the second connecting line with the waste reservoir, and the analytical pump provides a flow to clean itself.

U8. Use according to any of the preceding use embodiments, wherein the use is a use in liquid chromatography.

U9. Use according to the preceding embodiment, wherein the use is in high performance liquid chromatography.

Below, method embodiments will be discussed. These embodiments are abbreviated by the letter "M" followed by a number. When reference is herein made to a method embodiment, those embodiments are meant.

M1. A method for sample loading comprising the steps of
  a. providing a liquid chromatography system comprising a first switching valve, a second switching valve, a first connecting line fluidly connecting the first switching valve to the second switching valve and a second connecting line fluidly connecting the first switching valve to the second switching valve, a metering device located in the first connecting line, a separation column, a trap column, and an analytical pump; and
  b. loading a sample into the trap column; and
  c. fluidly connecting the trap column to the separation column and the analytical pump to the trap column via the first switching valve and generating a flow from the analytical pump to the separation column.

M2. A method according to the preceding embodiment further comprising
  d. fluidly connecting the analytical pump to the separation column, wherein the trap column is not fluidly connected to the analytical pump or the separation column, and maintaining the flow from the analytical pump to the separation column.

M3. A method according to any of the preceding method embodiments further comprising
  e. washing the trap column and the connecting lines; and/or
  f. loading another sample into the trap column.

M4. A method according to any of the preceding method embodiments wherein the liquid chromatography system further comprises a sample pick up means adapted to retrieve the sample and a seat adapted to receive the sample pick up means.

M5. A method according to the preceding embodiment, wherein step b. comprises the sample pick up means being moved to a sample reservoir, the sample being sucked into the sample pick up means and into a tubing section adjacent to the sample pick up means, the sample pick up means being moved to the seat, the first switching valve being set to provide a fluid connection between the seat and the trap column, the sample being introduced into the trap column.

M6. A method according to the preceding embodiment, wherein the sample is sucked into the sample pick up means by means of the metering device generating negative pressure.

M7. A method according to any of the preceding method embodiments and with features of embodiment M5, wherein the sample is introduced into the trap column by connecting the first connecting line to a dead end via the second switching valve and to the trap column via the first switching valve, and the metering device pushing the sample from the first connecting line to the trap column by generating positive pressure.

M8. A method according to any of the preceding method embodiments wherein the liquid chromatography system further comprises a waste reservoir.

M9. A method according to the preceding embodiment and with the features of embodiment M3 wherein step e. comprises fluidly connecting the first connecting line to a dead end via the second switching valve and to the trap column via the first switching valve, and the second connecting line to the trap column via the first switching valve and to the waste reservoir via the second switching valve, and generating a flow from the metering device to the waste reservoir.

M10. A method according to any of the preceding method embodiments with the features of embodiments M2 and M3 wherein step d. is performed concurrently with steps e. and/or f.

M11. A method according to any of the preceding method embodiments, wherein the method comprises pressurizing the trap column after loading the sample into it.

M12. A method according to the preceding embodiment, wherein the trap column is pressurized when the trap column is not fluidly connected to the analytical pump.

M13. A method according to any of the preceding two embodiments, wherein the trap column is pressurized when the trap column is not fluidly connected to the separation column.

M14. A method according to any of the preceding 3 embodiments wherein the metering device pressurizes the trap column.

M15. A method according to any of the preceding method embodiments, wherein the method comprises depressurizing the trap column after supplying the sample from the trap column to the separation column.

M16. A method according to the preceding embodiment, wherein the trap column is depressurized when the trap column is not fluidly connected to the analytical pump.

M17. A method according to any of the preceding two embodiments, wherein the trap column is depressurized when the trap column is not fluidly connected to the separation column.

M18. A method according to any of the preceding 3 embodiments, wherein the metering device depressurizes the trap column.

M19. A method according to any of the preceding method embodiments and with the features of embodiment M11 wherein the trap column is pressurized to a pressure of at least 100 bar, preferably 1000 bar, more preferably at least 1500 bar.

M20. A method according to any of the preceding method embodiments wherein the metering device loads the sample into the trap column.

M21. A method according to any of the preceding method embodiments and with the features of embodiment M3 wherein the metering device washes the trap column and the connecting lines by generating positive pressure.

BRIEF DESCRIPTION OF THE DRAWINGS

The above features along with additional details of the invention, are described further in the examples below, which are intended to further illustrate the invention but are not intended to limit its scope in any way.

DETAILED DESCRIPTION OF EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

It is noted that not all of the drawings carry all the reference signs. Instead, in some of the drawings, some of the reference signs have been omitted for sake of brevity and simplicity of illustration.

Figure 1:
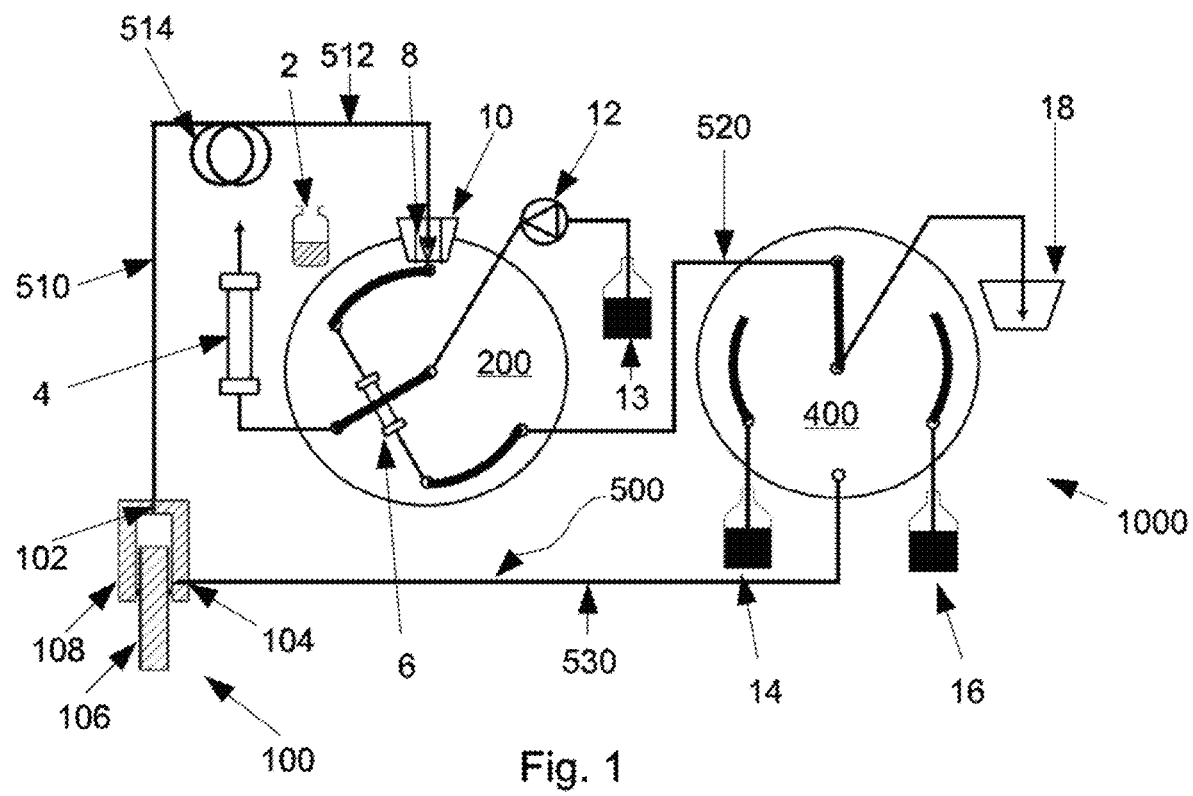
FIG. 1 schematically depicts a liquid chromatography system according to one embodiment of the invention.

FIG. 1 depicts a liquid chromatography system 1000 according to one aspect of the invention. The system 1000 comprises a sample reservoir 2 comprising a sample to be analysed. The system 1000 further comprises a separation column 4 and a trap column 6. The system comprises a sample pick up means 8, shown here as a needle 8 and a seat 10, shown here as needle seat 10. The liquid chromatography system 1000 comprises an analytical pump 12 and a pump solvent reservoir 13. FIG. 1 further shows two solvent reservoirs 14 and 16, but in other embodiments of the system 1000 one solvent reservoir 14 or 16 can be used. The system 1000 further comprises a waste reservoir 18. The liquid chromatography system also comprises a metering device 100. The metering device 100 comprises a port 102, a port 104, a piston 106 and a housing 108. The liquid chromatography system 1000 further comprises two switching valves, a first or left switching valve 200 and a second or right switching valve 400. The system 1000 also comprises tubing or capillaries connecting various components. Tubing 510 connects port 102 of the metering device 100 with the needle 8. Tubing 512 can be directly adjacent to the needle 8. Between the metering device 100 and the needle 8, past tubing 512 (which tubing 512 may also be referred to as sample loop 512), system 1000 can further comprise a buffer loop 514. The buffer loop 514 may provide an additional length of tubing to allow movement of the needle 8. Second connecting line 520 (or tubing 520) connects the first switching valve 200 directly to the second switching valve 400. Tubing 530 connects port 104 of the metering device 100 with the second switching valve 400. Tubing 510, 514, 512 and 530 may collectively be referred to as a first connecting line 500. That is, the first connecting line 500 connects the first switching valve 200 with the second switching valve 400 via the needle 8 and needle seat 10 on the one hand, and via the metering device 100 on the other hand.

The second connecting line 520 is connected directly with both switching valves 200, 400, while the first connecting line 500 is also comprising the metering device 100. In this embodiment, the connecting line is also separable through a needle 8/needle seat 10 connection. However, an embodiment without this connection in the first connecting line 500 is also possible.

The liquid chromatography system 1000 is adapted to retrieve a sample from the sample reservoir 2. This can be achieved via the sample pick up means 8. The sample pick up means can travel to the sample reservoir 2 (see FIG. 4), retrieve the sample, and travel back to the needle seat 10. Retrieval of the sample can be done via a pressure difference generated by the metering device 100. The metering device 100 can move its piston 106 outward of the metering device housing 108 to draw in solvent 14 or solvent 16, and then move further outward to generate the pressure difference for sucking in the sample from the sample reservoir 2. This can be achieved by switching the first connecting line 510 to a dead end via the second switching valve 400. The sample can then be introduced into the system via needle 8 and optionally also tubing 512. The sample can be first stored in the needle 8 and optionally in the sample loop 512. This is further discussed in relation to FIGS. 3 and 4.

The liquid chromatography system 1000 is further adapted to introduce the sample into the trap column 6. This can be done via the metering device 100 as well, by moving its piston 106 and generating a pressure difference. This is further discussed in relation to FIG. 5.

The liquid chromatography system 1000 is further adapted to pre-compress the trap column 6 to the pressure of the separation column 4. In High Performance Liquid Chromatography (HPLC), the pressures at which the sample is separated into its constituents in the separation column 4 can exceed 100 bar. It can be on the order of a few hundred bar or exceed 1.000 bar, such as 1.500 bar. Therefore, the pressure within the separation column can significantly differ from the pressure within the parts of the system in contact with the atmosphere, such as the needle 8. The pre-compressing then allows to equilibrate the pressure within the system. Pre-compressing can be done via the metering device 100 by generating a positive pressure via the piston 106. This can be achieved by switching both the first connecting line 500 and the second connecting line 520 to dead ends via the second switching valve 400. This is further discussed in relation to FIG. 6.

The system 1000 is also adapted to inject the sample from the trap column 6 to the separation column 4 by means of the analytical flow. This can be done by guiding the sample by means of the analytical pump 12. The injection of the analytical flow into the separation column 4 can be done in a back flush and in a forward flush manner via different positions of the switching valve 200. That is, the flow from the trap column 6 to the separation column 4 can ensue in the same direction as the flow from the needle 8 to the trap column 6 above (forward flush). The flow from the trap column 6 to the separation column 4 can also ensue in the opposite direction to the flow from the needle 8 to the trap column 6 above (backward flush). Switching between the two options can be done via different switching positions of the valve 200 without dismantling the system 1000. This is further explained in relation to FIGS. 7a and 7b.

The liquid chromatography system 1000 is also adapted to decompress the trap column 6. After sample injection into the separation column 4, the system 1000 is at analytical pressure, which, as discussed above, can be on the order of several hundred bar or even above 1.000 bar. Before reconnecting the trap column 6 with the outside, which is at atmospheric pressure, it can be advantageous to decompress it in a controlled manner. This can be done via the metering device 100 by displacing the piston 106 in order to reduce the pressure within the trap column 6. As the pre-compressing, this requires that both the first connecting line 500 and the second connecting line 520 are switched to dead ends via the second switching valve 400. This is further discussed in relation to FIG. 8. The controlled decompression may be advantageous for different reasons. By means of the controlled decompression, no uncontrolled and more rapid decompression occurs. Thus, the controlled decompression leads to less abrasion on the valve 200 and other components and also prevents fluid from rapidly exiting the system (which could be a risk for a user). Furthermore, the controlled decompression also lowers the risk of components outgassing in the fluid in the system.

The system 1000 is also adapted to clean or wash itself. Particularly, the metering device 100 can draw in solvent from solvent reservoirs 14 or 16 by displacing the piston 106 and generating a pressure difference. The solvent can then be passed through the buffer loop 514, the needle 8, the needle seat 10 and the trap column 6 in order to remove any residual components of the sample or of the flow. These can then be washed by the solvent and delivered into the waste reservoir 18. Advantageously, the system 1000 is adapted to allow the metering device 100 to wash the trap column 6 and the tubing or capillaries while the sample is being analysed in the separation column 4. This leads to more efficient system operation. This is further discussed in relation to FIG. 9.

The liquid chromatography system 1000 can also be adapted to clean or purge the analytical pump 12. The pump solvent reservoir 13 can be replaced and the pump 12 washed with the residual fluid delivered into the waste reservoir 18. The analytical pump 12 and the waste reservoir 18 can in this case be connected via the second connecting line 520. This is further discussed in relation to FIG. 10.

Figure 2:
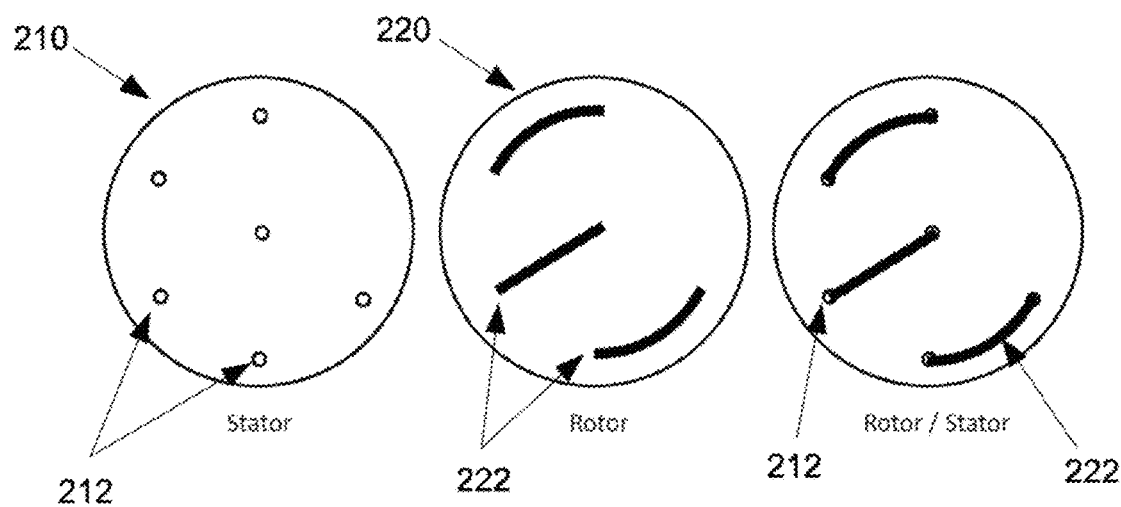
FIG. 2 schematically depicts features of a switching valve according to one embodiment of the invention.

FIG. 2 schematically illustrates a switching valve such as the first (or left) switching valve 200 and/or the second (or right) switching valve 400. Each switching valve 200 may comprise a stator 210 and a rotor 220. The stator 210 may comprise ports 212 to which different elements may be connected (e.g., in the embodiment depicted in FIG. 1, each of the needle 8, the analytical pump 12, the separation column 4 and the second connecting line 520 to the other switching valve 400 is fluidly connected to one port of the switching valve 200, respectively, and the trap column 6 is fluidly connected to two ports of this switching valve 200). More particularly, these components are each directly fluidly connected to the respective port or the respective ports. When a component is said to be directly fluidly connected to a port, this should denote that there is a fluid connection between this component and the port (that is, fluid may flow from the component to the port and/or vice versa) and that this fluid connection is such that there is no other port in this connection. For example, the central port in the left valve 200 in FIG. 1 is directly fluidly connected to the pump 12. This central port in FIG. 1 is not fluidly connected, e.g., to the metering device 100, but is also fluidly connected to the separation column 4. However, the connection between the central port and the separation column 4 is not a direct fluid connection, as fluid flowing from this central port would have to travel via another port before reaching the separation column. With reference to FIG. 2, the rotor 220 may comprise connecting elements 222, such as grooves 222, that may interconnect different ports 212 of the stator element 210. For example, FIG. 1 depicts a configuration where each connecting element 222 of the rotor of the left distribution valve 200 interconnects two ports of said switching valve, respectively, while the stator and the rotor of the second switching valve 400 are in such a configuration that only two of the ports in the second switching valve are interconnected to one another (that is, the ports connecting the second connecting line 520 and waste reservoir 18 are connected by a connecting element of the second switching valve 400). It will be understood that whenever two elements are described to be connected to one another, this denotes a fluid connection, i.e., a connection where a fluid may flow from one element to the other, unless otherwise specified or unless clear to the skilled person that something different is meant.

Though not depicted, it is noted that there may also be provided blind plugs closing off one or more ports of the switching valves 200, 400. In particular, the distributor valves 200, 400 may be identical to one another (and only differ by the use of the blind plugs), which may simplify the productions process. However, the distributor valves 200, 400 may also be different to each other.

Figure 3:
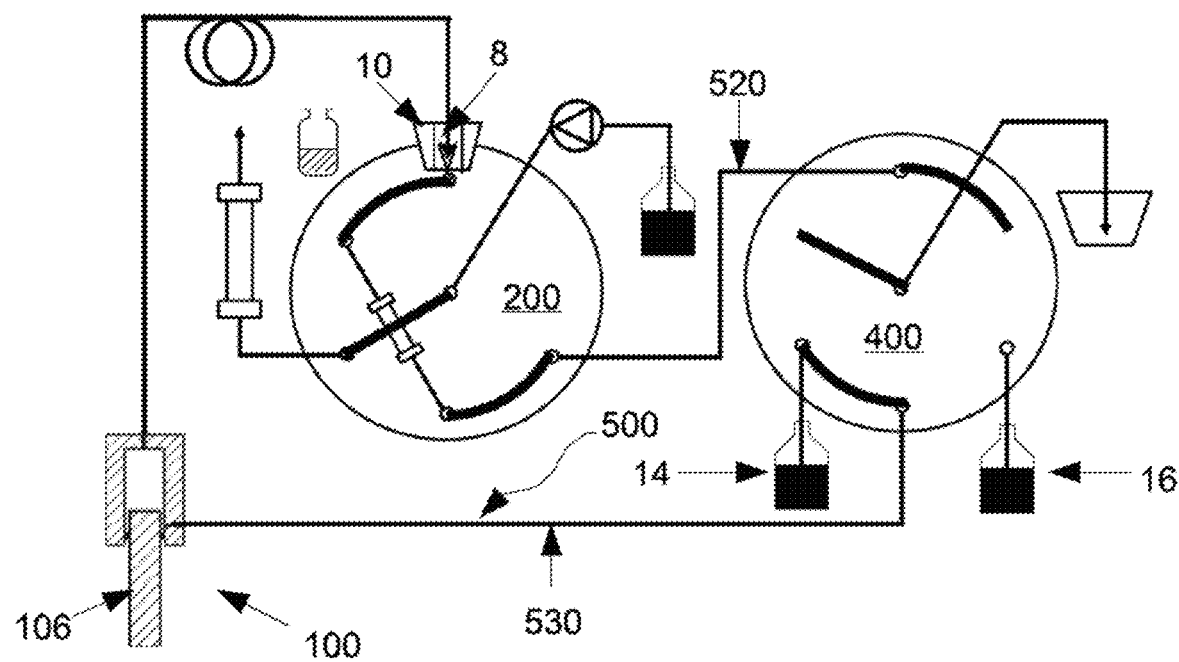
FIG. 3 schematically depicts filling of the metering device with solvent according to one embodiment of the invention.

FIG. 3 schematically depicts filling of the metering device 100 with solvent according to one embodiment of the invention. In other words, FIG. 3 depicts the choice and retrieval of the solvent and cleaning agent. The right switching valve 400 is fluidly connecting the metering device 100 to the solvent reservoir 14 via the first connecting line 500. Note, that connection to solvent reservoir 16 would also be possible by a different arrangement of one of the connecting elements. The piston 106 of the metering device 100 can now move back in order to create negative pressure and draw up solvent from the solvent reservoir 14 and partially fill the metering device 100 with it (the metering device 100 needs to have enough residual space to also draw in the sample). The metering device 100 may then have enough solvent in order to guide the sample into the trap column 6 for the trapping. The selection and retrieval of the solvent is possible because the first connecting line 500 is, on one hand, connected with the desired solvent 14 (or 16) through the second switching valve 400 and, on the other hand, is fluidly connected with the second connecting line 520. This allows negative pressure to be generated allowing the intake of the solvent through the metering device 100.

Figure 4:
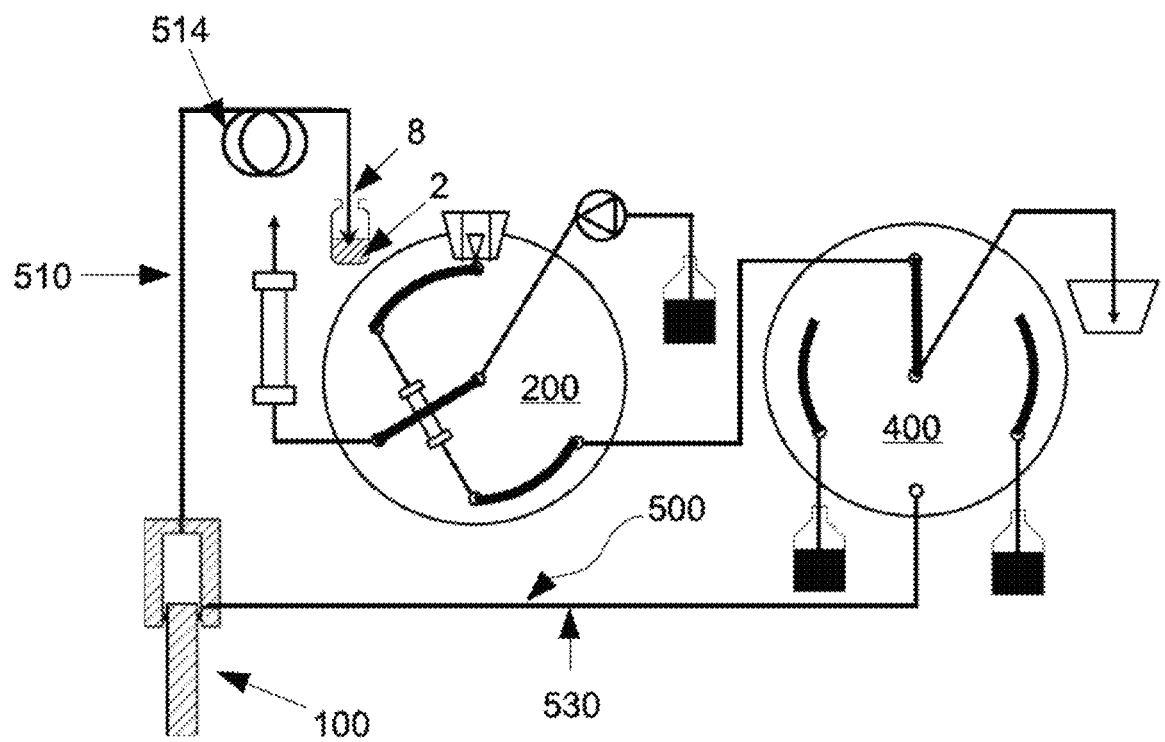
FIG. 4 schematically depicts drawing in of the sample according to one embodiment of the invention.

FIG. 4 schematically depicts drawing in of the sample according to one embodiment of the invention. The needle 8 moves to the sample reservoir 2, thus separating the first connecting line 500. The second switching valve 400 closes the supply line to the metering device 100 by switching from the solvent reservoir 14 to a dead end. In this way, the metering device 100 can generate negative pressure by retreating its piston 106 further to draw in the sample through the needle 8. Since the second connecting line 520 is switched to a dead end via the second connecting valve 400, the metering device 100 can generate negative pressure allowing the intake of the solvent through the metering device 100.

Figure 5:
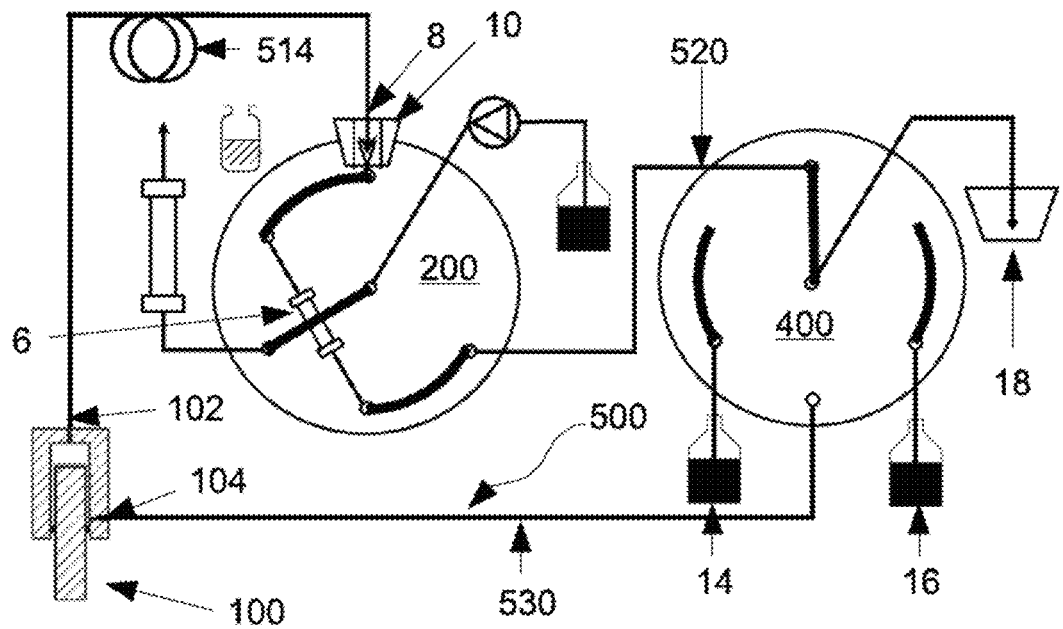
FIG. 5 schematically depicts sample injection into the trap column according to one embodiment of the invention.

FIG. 5 schematically depicts sample injection into the trap column 6 according to one embodiment of the invention. In other words, fluidic components including the trap column 6 are washed in this configuration and the sample is trapped in the trap column 6. More particularly, the needle 8 now returns to the needle seat 10, and the first connecting line 500 is now again connecting both switching valves 200, 400. The sample can be meanwhile stored in the sample loop 512. The first connecting line 500 is again switched to a dead end via the second switching valve 400. The metering device 100 can now generate a positive pressure by moving its piston 106 back into the housing 108. In this way, the sample can be pushed in the other direction through the needle 8 into the trap column 6. The right valve 400 connects a side of the trap column 6 opposite to the one the sample arrived through with the waste reservoir 18. In this position, the piston 106 of the metering device 100 can move forward and therefore push the sample with the previously raised trap solvent to the trap column 6. Components which do not adhere to the trap column 6 get pushed out to the waste reservoir 18. This process may be repeated if the right valve 400 again connects the port 104 (which may also be referred to as the rear output) of the metering device 100 with the solvent reservoirs 14 or 16 and therefore allows the metering device 100 to raise fresh trap solvent. That is, more trap solvent may be introduced into the section of the system fluidly connected to the trap column 6 in FIG. 5. To do so, valve 400 is moved to connect tubing 530 to solvent reservoir 14 or 16 (that is the configuration of valve 400 in FIG. 3), and thus port 104 is opened and port 102 of metering device 100 is closed (by being switched to a dead end). The second switching valve 400 also switches the second connecting line 520 to a dead end, allowing for pressure build-up. When the piston 106 is moved back in such a configuration, solvent is drawn from the solvent reservoir 14 (or 16) into the metering device 100. Subsequently, port 104 can be closed (by being connected to a dead end) and port 102 be opened (i.e. not connected to a dead end). Then, piston 106 may be moved forward to supply the solvent into tubing section 510 to thereby supply more solvent towards the trap column 6. This process may also be referred to as trapping (and retrapping) the sample.

That is, with general reference to FIGS. 4 and 5, it is noted that, for the washing phase or for another sample retrieval for trapping, the first connecting line 500 is switched to a dead end via the second valve 400 to either draw up the sample and/or guide the cleaning solution. For this purpose, the first connecting line 500 remains fluidly connected with the second connecting line 520 via the first valve 400, and the second connecting line 520 is connected with the waste 18 via the second valve 400.

Figure 6:
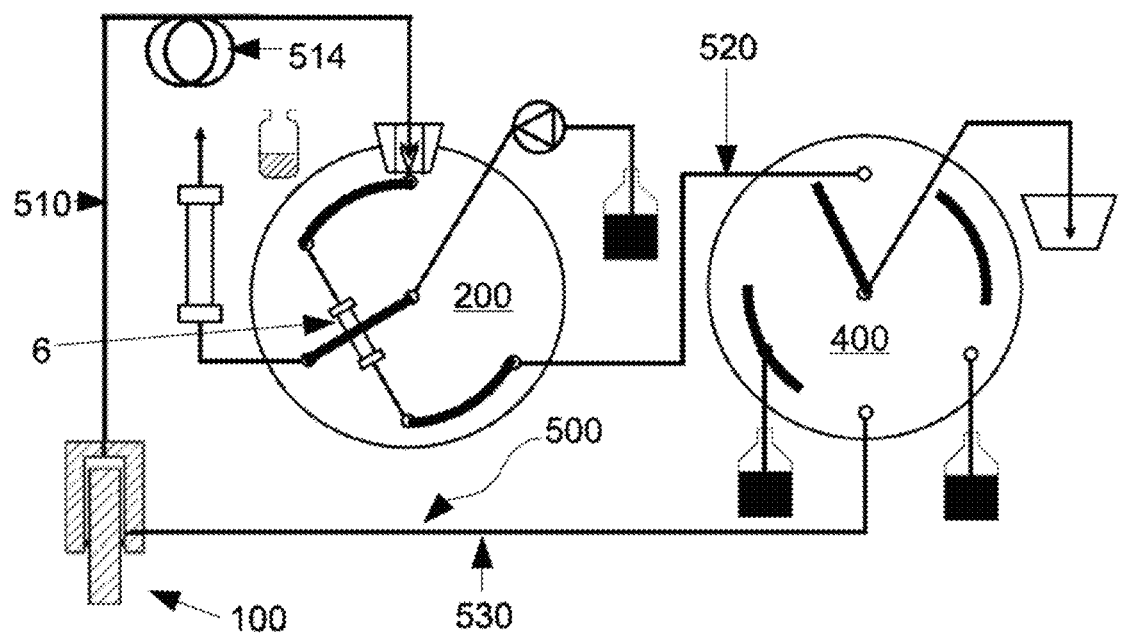
FIG. 6 schematically depicts pre-compression of the trap column according to one embodiment of the invention.

FIG. 6 schematically depicts pre-compression of the trap column 6 according to one embodiment of the invention. The right valve 400 switches to an intermediate position, i.e., to the position where both the first connecting line 500 (or, more specifically, its section referred to as tubing 530) and the second connecting line 520 are switched to a dead end. The piston 106 in the metering device 100 moves forward, such that volume in the tubing 510 (which includes the buffer loop 514), the trap column 6, the metering device 106 and the connections is compressed. It can be compressed until analytical pressure is reached. Though not depicted, the system 1000 may also comprise a pressure sensor. The pressure sensor may be fluidly connected to the metering device 100 (e.g., it may be disposed between metering device 100 and the second switching valve 400). Thus, when precompressing a section of the system 1000 (as discussed), one may monitor the pressure in this section—e.g., to bring this pressure to the analytical pressure. The sensor may also be used for monitoring the decompression of a section of the system. By the pre-compression step, the sample in the trap column 6 may be brought to an elevated pressure, such as to the analytical pressure. The controlled pre-compression step may reduce pressure spikes in the system, thereby reducing wear and leading to a longer service life of the system. Further, not having pressure spikes also reduced the likelihood of the sample being mixed with solvent, i.e., dispersion. Having a less dispersed sample leads to a more defined peak in subsequent analysis, thereby resulting in an improved analysis.

In some previously known liquid chromatography embodiments, the valve responsible for the injection process was also responsible for the pre-compression position switching. However, this would require an intermediate position of the valve, so that both ends of the pre-compressed elements (the buffer loop and the trap column) would have no connection to the atmosphere and simultaneously the analytical flow to the separation column is not interrupted. In the presently disclosed embodiments, this is done by spatially separating both functions (injection/pre-compression) via two switching valves 200, 400 that are connected by at least two connection lines 500, 520. The sample pre-compression position can then be assumed via the second valve 400, by switching the ends of the two connecting lines 500, 520 to dead ends. The connecting lines 500, 520 can remain fluidly connected via the first connecting valve 200. The metering device 100 can now pre-compress the buffer loop 514, the trap column 6 and various tubing to system pressure (that is, the pressure of the separation column 4).

The pre-compression position can be assumed via the second valve 400 in this embodiment, by switching the ends of the first and second connecting lines 500 and 520 to a dead end. The connecting lines 500, 520 remain fluidly connected via the first valve 200. Now, the metering device 100 can pre-compress the buffer loop and/or the trap column 6 to system pressure.

Figure 7A:
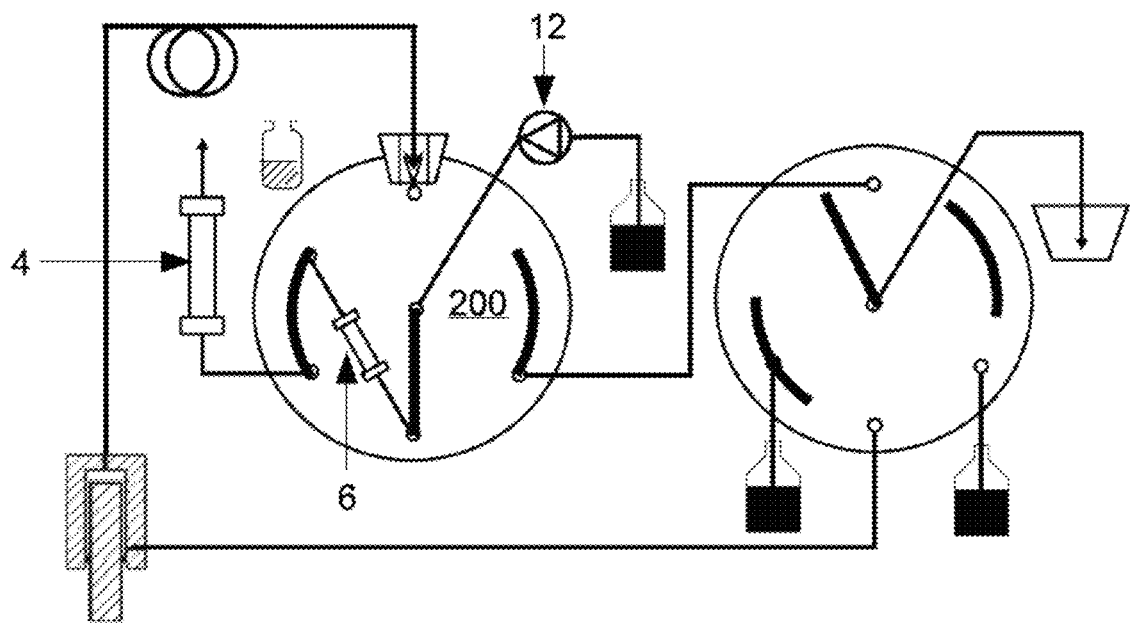
FIG. 7a schematically depicts back flush injection of the sample into the separation column according to one embodiment of the invention.
Figure 7B:
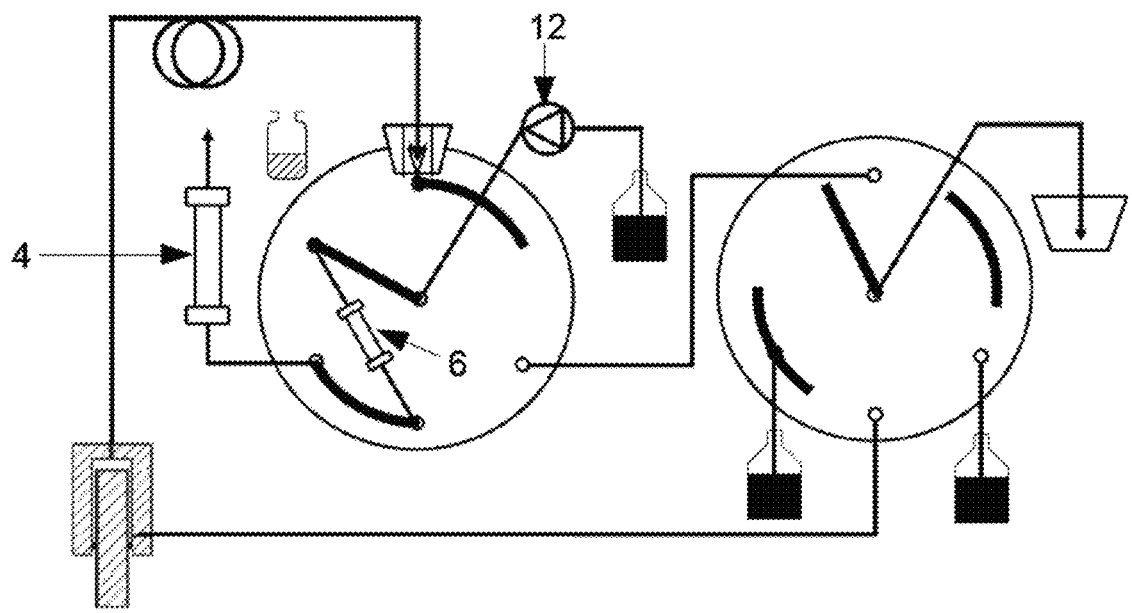
FIG. 7b schematically depicts forward flush injection of the sample into the separation column according to one embodiment of the invention.

FIG. 7a and FIG. 7b schematically depict injection of the sample into the separation column 4 according to one embodiment of the invention.

FIG. 7a demonstrates injection of the sample via back flushing. The left valve 200 is switched such that the trap column 6 is introduced into the analytical flow in such a way that the analytical flow pushes the sample back out the side it came from (backward flush). That is, the flow direction through the trap column 6 is opposite to the flow direction in which the trap column 6 was supplied with the sample. Put differently, a first end of the trap column 6 that has been upstream from a second end of the trap column 6 when being provided with the sample is now downstream from this second end when the analytical flow is provided through the trap column 6.

FIG. 7b demonstrates injection of the sample via forward flushing. That is, the flow direction through the trap column 6 is parallel to the flow direction with which the trap column 6 was supplied with the sample. Put differently, a first end of the trap column 6 that has been upstream to a second end of the trap column 6 when being provided with the sample is now also upstream to this second end when the analytical flow is provided through the trap column 6.

Note, that switching between configurations shown in FIGS. 7a and 7b is done by moving the connecting elements 222 (not shown) of the first switching valve 200. That is, the process of switching between the back flush and forward flush configurations can be done without dismounting the apparatus and without hardware changes. It is not necessary to manually or automatically switch the ports 212 (not shown) of the switching valve 200 to which the analytical pump 12, the trap column 6 and the separation column 4 are connected. These components remain connected to the same ports 212 in the backward and forward flush configurations. This is achievable due to the topology of the switching valve 200 and the flexibility in the connection of various pairs of ports 212 with the connecting elements or grooves 222. Therefore, in the present configuration, switching between the backward flush as in FIG. 7a and the forward flush as in FIG. 7b is simple and fast, and can be done between experiments without reconfiguring the liquid chromatography system 1000.

Figure 8:
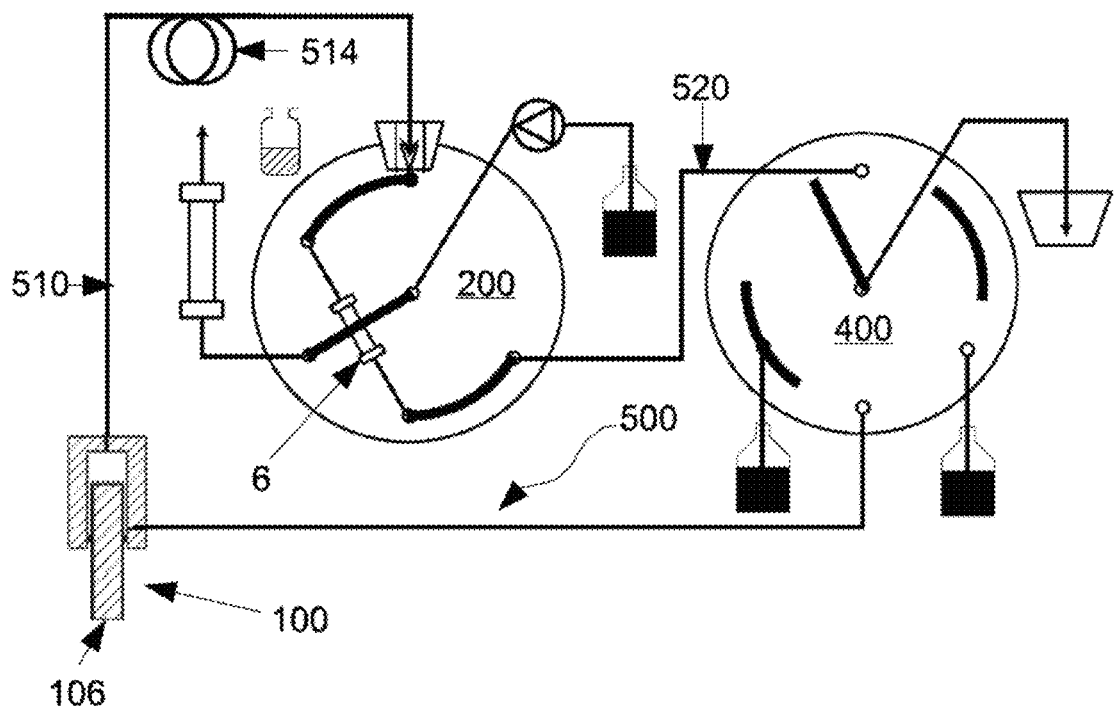
FIG. 8 schematically depicts decompression of the trap column according to one aspect of the invention.

FIG. 8 schematically depicts decompression of the trap column according to one aspect of the invention. This configuration is similar to the one depicted in FIG. 6. Again, the trap column 6 is fluidly connected to second connecting line 520, connecting valves 200 and 400 and to the first connecting line 500 (more specifically, to its section referred to as tubing 510) providing a connection to the metering device 100. By moving the piston 106 back, the pressure still present in the portion of the system 1000 fluidly connected to the trap column 6 (including the buffer loop 514, the metering device 100 and the connections) can be reduced. That is, this configuration may also be referred to as the decompress state. As discussed, the controlled decompression may be advantageous, as it may lead to less abrasion, may prevent fluids from rapidly exiting the system and may reduce the risk of components outgassing.

Figure 9:
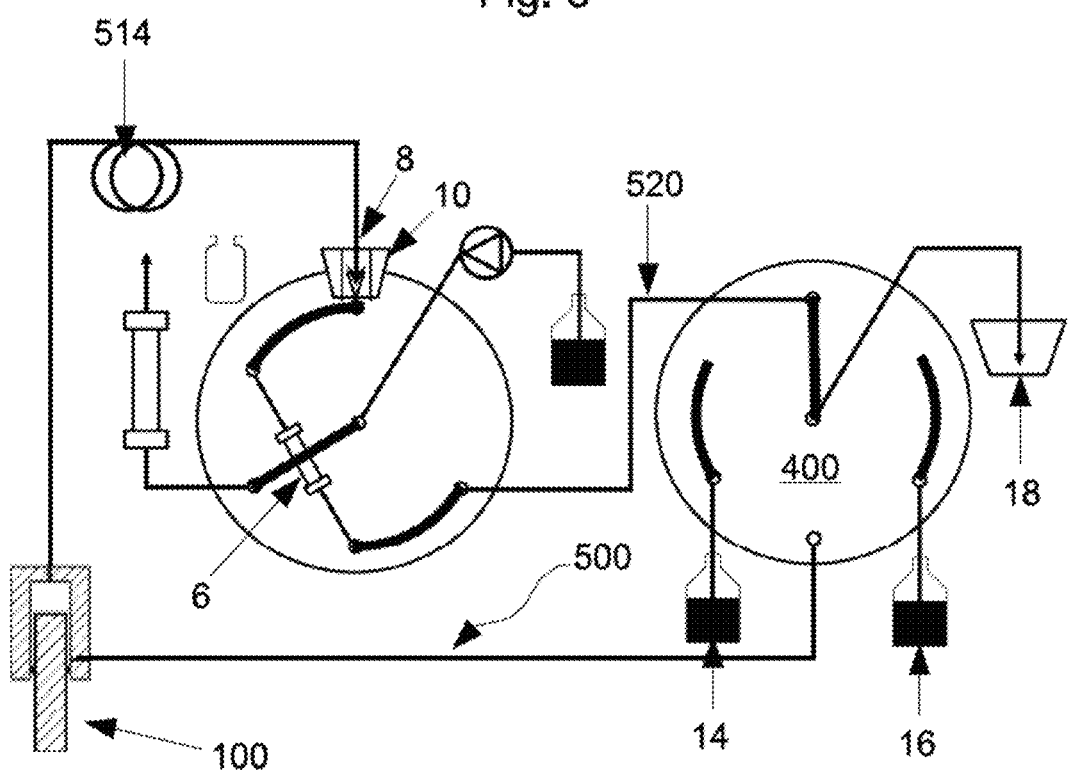
FIG. 9 schematically depicts washing of the system according to one aspect of the invention.

FIG. 9 schematically depicts washing of the system according to one aspect of the invention. The first connecting line 500 is now switched to a dead end via the second switching valve 400 so that it can guide the cleaning solution (alternatively, draw up a new sample and trap/guide it). The first connecting line 500 therefore remains fluidly connected with the second connecting line 520 via the trap column 6 and the first valve 200, and the second connecting line is connected with the waste reservoir 18 via the second switching valve 400. The trap column 6 is here fluidly connected to the waste reservoir 18 via the second connecting line 520. The metering device 100 can then wash itself, the first connecting line 500 including tubing 510, the buffer loop 514, the needle 8 and the needle seat 10, as well as the trap column 6 and the second connecting line 520. To do this, the right switching valve 400 may be switched so that the metering device 100 can draw up one of the solvents from solvent reservoirs 14, 16 and then switch back to inject solvent into the system for washing. The metering device 100 can be refilled multiple times for thorough washing. In this position, trapping of a new sample by the trap column 6 is also possible, while the first sample is undergoing analysis in the separation column 4. That is, the separation column 4 is fluidly connected with the analytical pump 12 without the trap column 6 in the way. The needle 8 can then retrieve a new sample and trap it in the trap column 6 while analysis of the previous sample is still underway in the separation column 4. This can lead to significant time saving and system efficiency. In other words, after the sample in the inject position is guided from the trap column 6 to the separation column 4 by the analytical pump 12, the first valve 200 can be switched back to the trap position or the wash position. In this position, the washing of fluidic components including the trap column 6 and/or trapping of a new sample by the trap column 6 are possible, while the previous sample is passing through the separation column 4 and is analysed, which saves time and therefore enhances the efficiency. It is also noted that washing may be performed simultaneously with equilibrating and/or sample analysis. Equilibrating may be done by means of the first (left) valve 200 by having the analytical pump 12 fluidly connected with the separation column 4 (i.e., valve 200 may not be switched when equilibrating) and the second (right) valve 400 being iteratively switched. It is generally noted that free selection of solvent or cleaning solution is also possible by means of the second valve 400. Thus, the selectivity may be increased.

It may also be advantageous that the metering device 100 can be used as a metering pump, a pre-compression device, a cleaning pump and a trapping or loading pump. This leads to an efficient system requiring less space and operating in a particularly optimized way.

Figure 10:
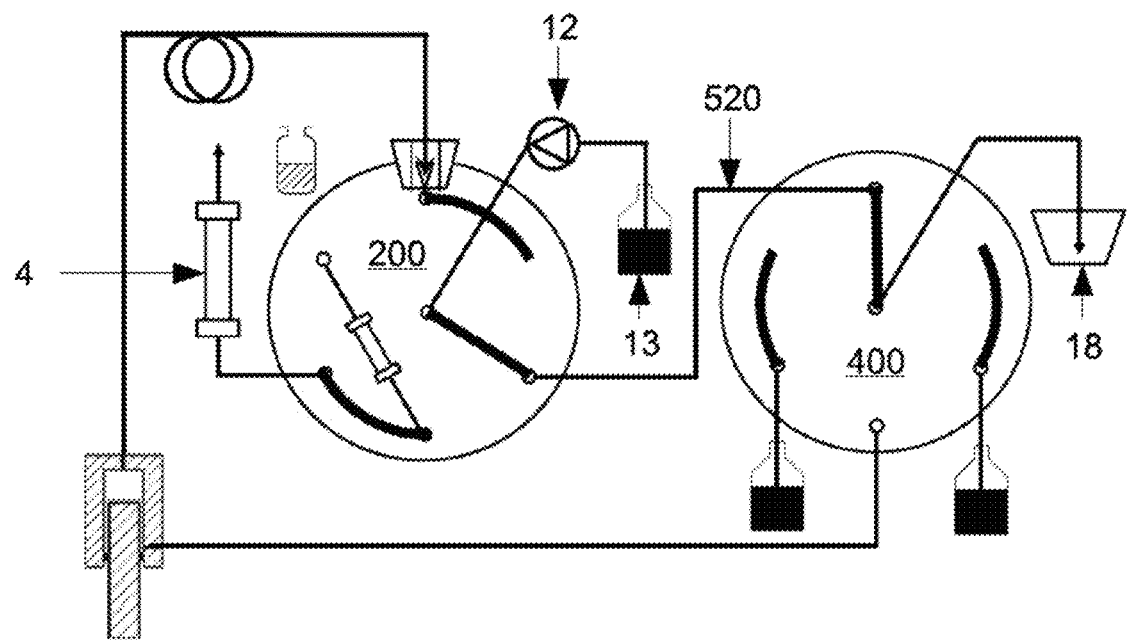
FIG. 10 schematically depicts analytical pump cleaning according to one aspect of the invention.

FIG. 10 schematically depicts analytical pump cleaning according to one aspect of the invention. In this position, the analytical pump 12 and the pump solvent reservoir 13 are fluidly connected with waste reservoir 18 via the second connecting line 520. The previously used pump solvent can now be quickly replaced in the intake lines and in the head of the analytical pump 12. The analytical pump 12 can then be washed effectively, using the direct connection to the waste reservoir 18. The replacement of one pump solvent with another may also function more efficiently, as a higher flow may be provided (as there is no column increasing the flow resistance in the path between the analytical pump 12 and the waste reservoir 18). The pump solvent may be selected by means of a solvent selector valve.

Figure 11:
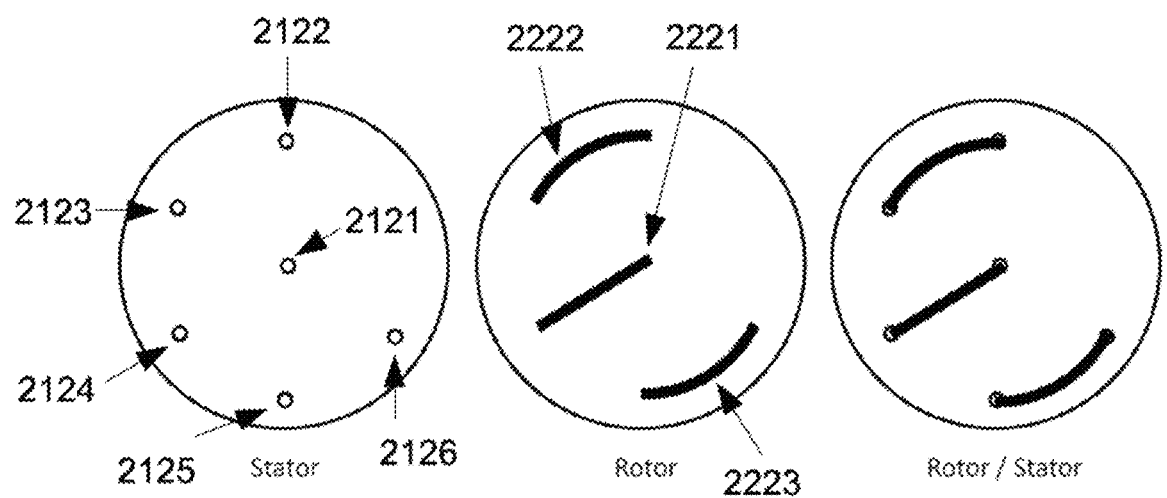
FIG. 11 schematically depicts a switching valve with a port arrangement according to one aspect of the invention.

FIG. 11 schematically depicts a switching valve with a port arrangement according to one aspect of the invention. The central port 2121 is adapted to be fluidly connected with any of the other ports 2122, 2123, 2123, 2125 and 2126. This is possible via the connecting elements or grooves 222. Particularly, the central port 2121 is adapted to be connected to any other port via the central connecting element 2221. The arrangements of the curved connecting elements 2222 and 2223 allows the switching valve 200, 400 to simultaneously connect the central port 2121 with another port and use the other connecting elements for further connection of ports allowing for multiple switching positions.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise. Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A system for component interconnection for use in Liquid Chromatography comprising: a. a first switching valve; b. a second switching valve; c. a first connecting line fluidly connecting the first switching valve to the second switching valve; d. a second connecting line fluidly connecting the first switching valve to the second switching valve; e. a metering device located in the first connecting line; wherein the system further comprises: an analytical pump adapted to generate an analytical flow in the system, a separation column and a trap column fluidly connected to two ports of the first switching valve, wherein the system further comprises a sample pick up means adapted to retrieve a sample and a seat adapted to receive the sample pick up means; wherein the first connecting line comprises: one end fluidly connected to the second switching valve, tubing connecting the second switching valve to the metering device and tubing connecting the metering device to the sample pick up means.

2. The system according to claim 1, wherein the first switching valve is adapted to simultaneously connect the analytical pump with the trap column and the trap column with the separation column in a sample inject position.

3. The system according to claim 1, wherein the system is adapted to reload the trap column with a new sample via the metering device in a reload position during sample analysis in the separation column.

4. The system according to claim 1, wherein the metering device is adapted to wash components connected via the first switching valve and the second switching valve in the washing position during sample analysis.

5. The system according to claim 1, wherein the system further comprises a waste reservoir; and wherein the system is further adapted to fluidly connect the analytical pump with the waste reservoir via the second connecting line in a pump purge position.

6. The system according to claim 1, wherein the first switching valve is adapted such that a fluidic connection between a port connected to the analytical pump and a port connected to the separation column is substantially dead volume free during sample analysis by being substantially free of spaces in which liquid can gather and remain.

7. The system according to claim 1, wherein the second switching valve is adapted to connect the metering device and the first switching valve to dead ends via the first connecting line and the second connecting line respectively when the first and second switching valves are in a pre-compressing position.

8. The system according to claim 7, wherein the metering device is adapted to generate positive pressure pre-compressing components connected via the first switching valve including the sample, when the first and second switching valves are in the pre-compressing position.

9. The system according to claim 1, wherein: one port of the first switching valve is directly fluidly connected to the seat and to the first connecting line; and two ports of the first switching valve are directly fluidly connected to the trap column; and one port of the first switching valve is directly fluidly connected to the separation column; and one port of the first switching valve is directly fluidly connected to the analytical pump; and one port of the first switching valve is directly fluidly connected to the second connecting line.

10. A method for sample loading comprising the steps of: a. providing a liquid chromatography system comprising: a first switching valve, a second switching valve, a first connecting line fluidly connecting the first switching valve to the second switching valve, a second connecting line fluidly connecting the first switching valve to the second switching valve, a metering device located in the first connecting line, a separation column, a trap column, and an analytical pump; wherein the system further comprises: a sample pick up means adapted to retrieve a sample and a seat adapted to receive the sample pick up means; wherein the first connecting line comprises: one end fluidly connected to the second switching valve, tubing connecting the second switching valve to the metering device and tubing connecting the metering device to the sample pick up means; and b. loading a sample into the trap column; and c. fluidly connecting the trap column to the separation column and the analytical pump to the trap column via the first switching valve and generating a flow from the analytical pump to the separation column.

11. The method according to claim 10 further comprising: d. fluidly connecting the analytical pump to the separation column, wherein the trap column is not fluidly connected to the analytical pump or the separation column, and maintaining the flow from the analytical pump to the separation column.

12. The method according to claim 11 further comprising: e. washing the trap column and the first connecting line and the second connecting line and/or f. loading another sample into the trap column.

13. The method according to claim 12, wherein step d. is performed concurrently with step e.

14. The method according to claim 12, wherein step d. is performed concurrently with step f.

15. The method according to claim 10, wherein the liquid chromatography system further comprises: a sample pick up means adapted to retrieve the sample and a seat adapted to receive the sample pick up means; wherein step b. comprises: the sample pick up means being moved to a sample reservoir, the sample being sucked into the sample pick up means and into a tubing section adjacent to the sample pick up means, the sample pick up means being moved to the seat, the first switching valve being set to provide a fluid connection between the seat and the trap column and the sample being introduced into the trap column.

16. The method according to claim 15, wherein the sample is introduced into the trap column by connecting the first connecting line to a dead end via the second switching valve and to the trap column via the first switching valve, and the metering device pushing the sample from the first connecting line to the trap column by generating positive pressure.

17. The method according to claim 10, wherein the method comprises pressurizing the trap column after loading the sample into it.

18. The method according to claim 17, wherein the trap column is pressurized when the trap column is not fluidly connected to the analytical pump.

* * * * *

UNITED STATES PATENT AND TRADEMARK OFFICE
CERTIFICATE OF CORRECTION

| | | |
|---|---|---|
| PATENT NO. | : 11,953,472 B2 | Page 1 of 1 |
| APPLICATION NO. | : 17/667139 | |
| DATED | : April 9, 2024 | |
| INVENTOR(S) | : Thomas Wachinger et al. | |

It is certified that error appears in the above-identified patent and that said Letters Patent is hereby corrected as shown below:

In the Claims

In Column 21, Claim 1, Line 23, delete "valve," and insert -- valve; --, therefor.

Signed and Sealed this
Fourteenth Day of May, 2024

Katherine Kelly Vidal
*Director of the United States Patent and Trademark Office*